Figure 6:
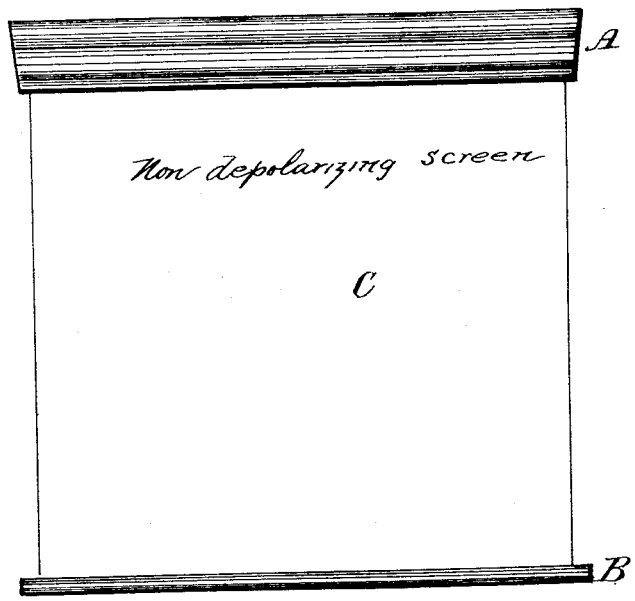

(No Model.) 2 Sheets—Sheet 1.
J. ANDERTON.
METHOD BY WHICH PICTURES PROJECTED UPON SCREENS BY MAGIC LANTERNS ARE SEEN IN RELIEF.
No. 542,321. Patented July 9, 1895.
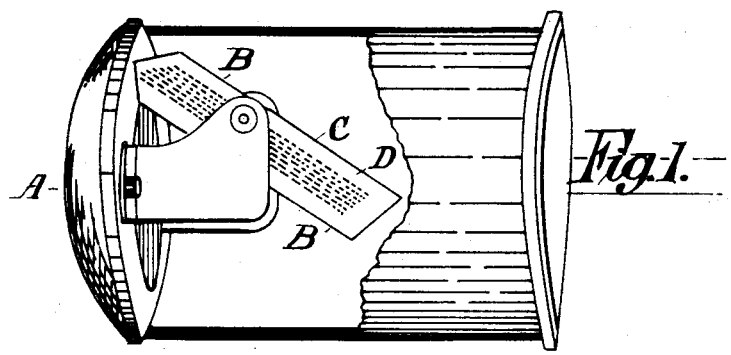
Fig. 1.
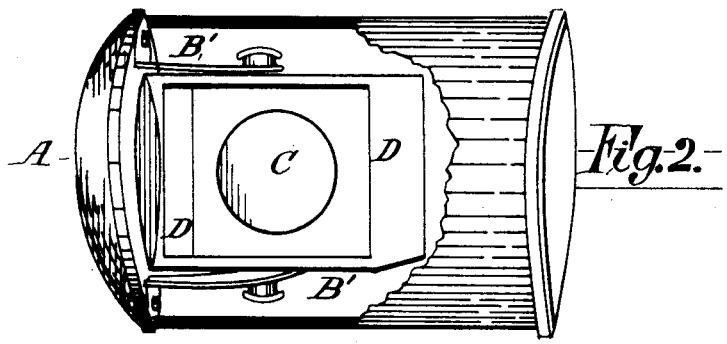
Fig. 2.
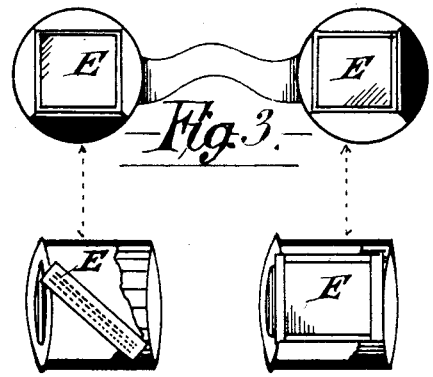
Fig. 3.
Fig. 4. Fig. 5.
Attest
Walter Donaldson
James M. Spear
Inventor
John Anderton
by Richards & Co.
Attys (No Model.) 2 Sheets—Sheet 2.

J. ANDERTON.
METHOD BY WHICH PICTURES PROJECTED UPON SCREENS BY MAGIC LANTERNS ARE SEEN IN RELIEF.

No. 542,321. Patented July 9, 1895.

Inventor:
John Anderton

Witnesses:
E. B. Bolton
E. K. Sturtevant

By _____ his Attorneys.

UNITED STATES PATENT OFFICE.

JOHN ANDERTON, OF BIRMINGHAM, ENGLAND.

METHOD BY WHICH PICTURES PROJECTED UPON SCREENS BY MAGIC LANTERNS ARE SEEN IN RELIEF.

SPECIFICATION forming part of Letters Patent No. 542,321, dated July 9, 1895.

Application filed July 5, 1893. Serial No. 479,630. (No model.) Patented in England July 7, 1891, No. 11,520, and in France October 8, 1892, No. 224,813.

*To all whom it may concern:*

Be it known that I, JOHN ANDERTON, a subject of the Queen of Great Britain, and a resident of Birmingham, England, have invented a Method or System by Means of which Pictures Projected upon a Screen from an Optical or Magic Lantern are Seen in Relief or with Stereoscopic Effect, (for which I have obtained a patent in Great Britain, No. 11,520, bearing date of July 7, 1891, and a patent in France, No. 224,813, bearing date of October 8, 1892,) of which the following is a specification.

The object of my invention is to bring out in relief or with stereoscopic effect pictures projected upon a screen or such like, and this is effected by employing two polarizers arranged at right angles to each other and in separate lanterns, in combination with a pair of analyzers having polarizers therein arranged at right angles to each other, the analyzer for one eye being adapted to obliterate the picture produced by one lantern while permitting the picture produced by the other lantern to be seen by the user of the analyzer.

Referring to the drawings, which form a part of this specification, Figure 1 shows in sectional elevation the polarizing arrangement connected to the optical system of an ordinary lantern; Fig. 2, a similar view with the polarizer turned one-quarter of a revolution of the disk; Fig. 3, back view of a pair of analyzers, showing position of glass plates; Fig. 4, sectional view of one of the analyzers; Fig. 5, sectional view of the other analyzer. Fig. 6 is a detail view of the screen used in my invention.

One of the two slides prepared from pictures taken by a stereoscopic camera or produced by other means is placed in one lantern of a biunial or in one of a pair of optical lanterns, and the other slide in a second lantern. Into the optical system of each lantern, which is of the ordinary description, or other arrangement for projecting images upon a screen, is introduced a polarizer consisting of a bundle of thin glass plates or a Nicol's prism or prisms, plate of tourmaline, or any other material or apparatus that will sufficiently polarize the light for the purpose intended. Preferably a bundle of thin glass plates is used.

In illustrating my method, one arrangement of the polarizing apparatus is shown, though the same may be varied, as above stated, to suit different requirements. Having an ordinary biunial in which one lantern stands above the other, I will first refer to the arrangement as applied to the top lantern. I place before the objective lens or lenses A, Fig. 1, a polarizer B, consisting of a bundle of thin glass plates C, (shown by dotted lines, Fig. 1,) at a requisite angle for producing polarization by transmission; and inclosed in a convenient case or frame D a lantern-slide is placed in the stage and focused as required, and an enlarged image is projected upon the screen. This enlarged image when seen by the unassisted eye appears in no way to differ from that projected by an ordinary optical lantern. If it be looked at through an analyzer consisting of a bundle of thin glass plates E, (dotted lines,) in position as seen in sectional view, Fig. 4, no change takes place; but if the analyzer or analyzers be turned to the position seen in sectional view, Fig. 5, the projected image will disappear. Therefore the analyzer affords the means to the observer of obliterating the image at will. The same effect may be obtained by holding the analyzer in a fixed position and by turning the polarizer in the lantern.

Referring to the arrangement in the second or bottom lantern, I now place another polarizer B', Fig. 2, in the optical system of same, similar to the one in the top lantern, and project a second picture by its aid upon the screen. The thin glass plates, as described, are so arranged in each lantern that the light from one will emerge polarized in a plane at right angles to that emerging from the other. Let it be assumed that both polarizers B B' are in the same relative position, as seen in Fig. 1, and that they are viewed through the analyzer in position as at Fig. 4. Under these conditions both projected pictures will be seen; but if the analyzer be turned to the position as at Fig. 5 both images will disappear. If now the polarizer is turned in the bottom lantern to the position seen in Fig. 2, and we view the projected images or pictures through the analyzer, only one will be seen at a time, for when the analyzer is held in position as seen in Fig. 4 the image or picture from the top lantern, with the polarizer placed as in Fig. 1, will be seen, the one from the bottom lantern, with the polarizer placed as seen in Fig. 2, having disappeared, and when the analyzer is in the position as in Fig. 5 the image or picture from the bottom lantern, Fig. 2, is seen, that projected from the top lantern, Fig. 1, having disappeared. Obviously, if an analyzer is used for each eye, one held to the right eye in position as at Fig. 4, and the other to the left eye in position as at Fig. 5, the right eye will see the image or picture projected by the top lantern, Fig. 1, and the left eye the image or picture projected by the bottom lantern, Fig. 2. By these means a separate picture is conveyed to each eye, and as these two pictures form a stereoscopic pair the impression is irresistibly conveyed to the mind of one picture only, and that a solid one. One analyzer will permit the image of one of the pictures, the one polarized in the same plane, to pass through to the eye, while the second picture polarized in a plane at right angles to it will not pass. With the second analyzer as above described, this order is reversed. The image of the picture stopped by the first analyzer passes through the second analyzer, while the other image is stopped. Therefore, as stated, upon each eye of the observer the image of a different picture falls, and as the two pictures are as nearly as possible superposed on the screen an image of one stereoscopic picture falls upon the retina of one eye, while an image of the second stereoscopic picture falls upon a corresponding portion of the retina of the other eye. The conditions being fulfilled under which stereoscopic vision of pictures is possible, the one picture seen appears in relief.

It will be understood that the two lanterns shown in Figs. 1 and 2, while intended to be used in combination, may be arranged in the same case or frame or they may be separate elements arranged adjacent to each other, as shown. In either case they go to make up the complete optical instrument.

Any number of observers, each furnished with a pair of analyzers, can see the effect at one and the same time. Moreover, colored pictures may be utilized as readily as those in black and white.

The analyzers designed for my purpose may resemble small opera glasses or any other suitable form, the necessary polarization of the light being effected by transmission by means of the glass plates.

The slides used in the lantern are prepared in the ordinary way from a stereoscopic negative—that is, a negative consisting of two pictures of the same object taken from different points of view.

The screen used, as shown in Fig. 6, must be especially adapted for the purpose to coact with the lantern and analyzers, so as not to depolarize or elliptically or circularly polarize the image or views it receives. Said screen may be of calico or other material having a coating of silver or other metallic element or compound, ground glass, metal, or other suitable substance, the essential characteristic being that it is of a non-depolarizing nature.

Having now described my invention, what I claim as new, and desire to secure by Letters Patent, is—

1. In an optical apparatus the combination of the pair of lanterns having the polarizers arranged at right angles to each other, the pair of analyzers having the analyzing plates arranged therein at right angles to each other and capable of analyzing the polarized light and a non depolarizing screen adapted to receive the pictures without depolarizing or either elliptically or circularly polarizing them, substantially as described.

2. In an optical apparatus, the combination, of the means for polarizing the light and throwing the pictures upon a screen, and the analyzers for analyzing the polarized light, having analyzing plates arranged therein at right angles to each other, substantially as described.

3. In an optical apparatus, the combination of the pair of lanterns having the polarizers arranged at right angles to each other and the pair of analyzers having the analyzing plates arranged therein at right angles to each other and capable of analyzing the polarized light, substantially as described.

In witness whereof I have hereunto set my hand in presence of two witnesses.

JOHN ANDERTON.

Witnesses:
J. WORDEN BROWETT,
EDWD. BURTON PAYNE.